(12) United States Patent
Takahashi et al.

(10) Patent No.: US 10,818,417 B2
(45) Date of Patent: Oct. 27, 2020

(54) CONDUCTIVE MEMBER

(71) Applicant: YAZAKI CORPORATION, Tokyo (JP)

(72) Inventors: Toshiharu Takahashi, Shizuoka (JP); Osamu Furugoori, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/440,770

(22) Filed: Jun. 13, 2019

(65) Prior Publication Data
US 2019/0385767 A1 Dec. 19, 2019

(30) Foreign Application Priority Data
Jun. 19, 2018 (JP) .................. 2018-116168

(51) Int. Cl.
*H01B 13/06* (2006.01)
*H01M 2/20* (2006.01)

(52) U.S. Cl.
CPC ............. *H01B 13/06* (2013.01); *H01M 2/20* (2013.01)

(58) Field of Classification Search
CPC ..................................... H01M 2/20
USPC ...................................... 174/68.2
See application file for complete search history.

(56) References Cited

U.S. PATENT DOCUMENTS

| 3,995,103 | A | * | 11/1976 | Gehrs | H02B 1/21 174/72 B |
| 4,629,136 | A | * | 12/1986 | Vallance | B65H 75/22 242/587.2 |
| 7,709,737 | B2 | * | 5/2010 | Keegan | H02G 5/005 174/520 |
| 7,954,206 | B2 | * | 6/2011 | Scroggie | B62D 29/048 24/297 |
| 2001/0025718 | A1 | * | 10/2001 | Maruyama | H02G 3/16 174/72 B |
| 2008/0024959 | A1 | | 1/2008 | Keegan et al. | |
| 2008/0260488 | A1 | | 10/2008 | Scroggie et al. | |
| 2011/0192641 | A1 | * | 8/2011 | Goto | H01R 12/7082 174/267 |
| 2015/0279520 | A1 | | 10/2015 | Koda | |

FOREIGN PATENT DOCUMENTS

DE 8903177 U1 5/1989
JP 2014-107201 A 6/2014

* cited by examiner

*Primary Examiner* — Stanley Tso
(74) *Attorney, Agent, or Firm* — Kenealy Vaidya LLP

(57) ABSTRACT

A conductive member includes a flat conductor having a substantially rectangular cross section, first and second cover members disposed so as to face each other with respect to front and back surfaces of the flat conductor, and sandwiching the flat conductor in a plate thickness direction of the flat conductor to cover the flat conductor, a locking portion provided on the first cover member and protruding toward the second cover member, and an engagement portion provided on the second cover member, and configured to hold the first and second cover members in a state that the flat conductor is sandwiched between the first and second cover members and the engagement portion engages with the locking portion which passes through a through hole provided in a central portion of the flat conductor.

4 Claims, 9 Drawing Sheets

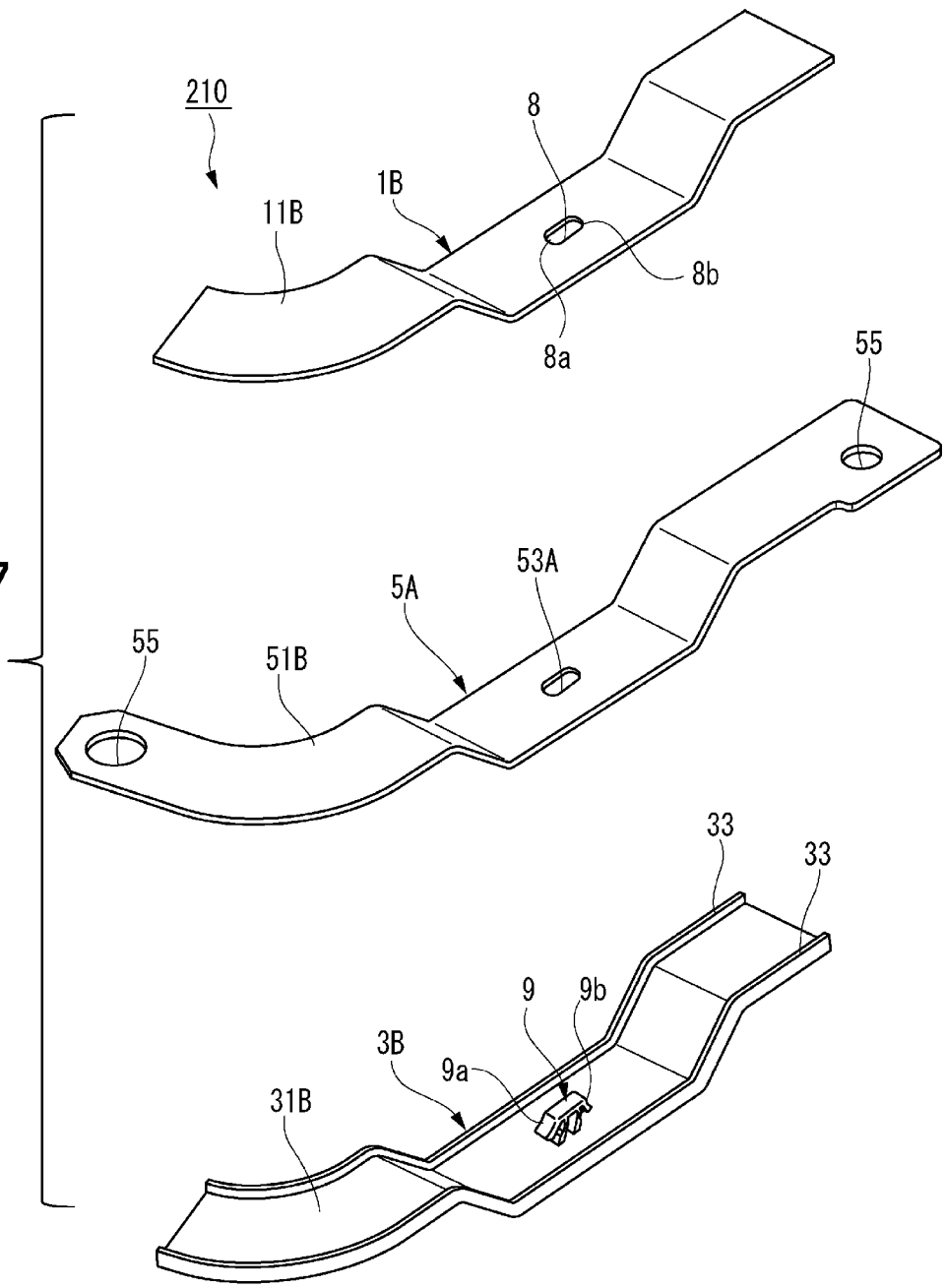

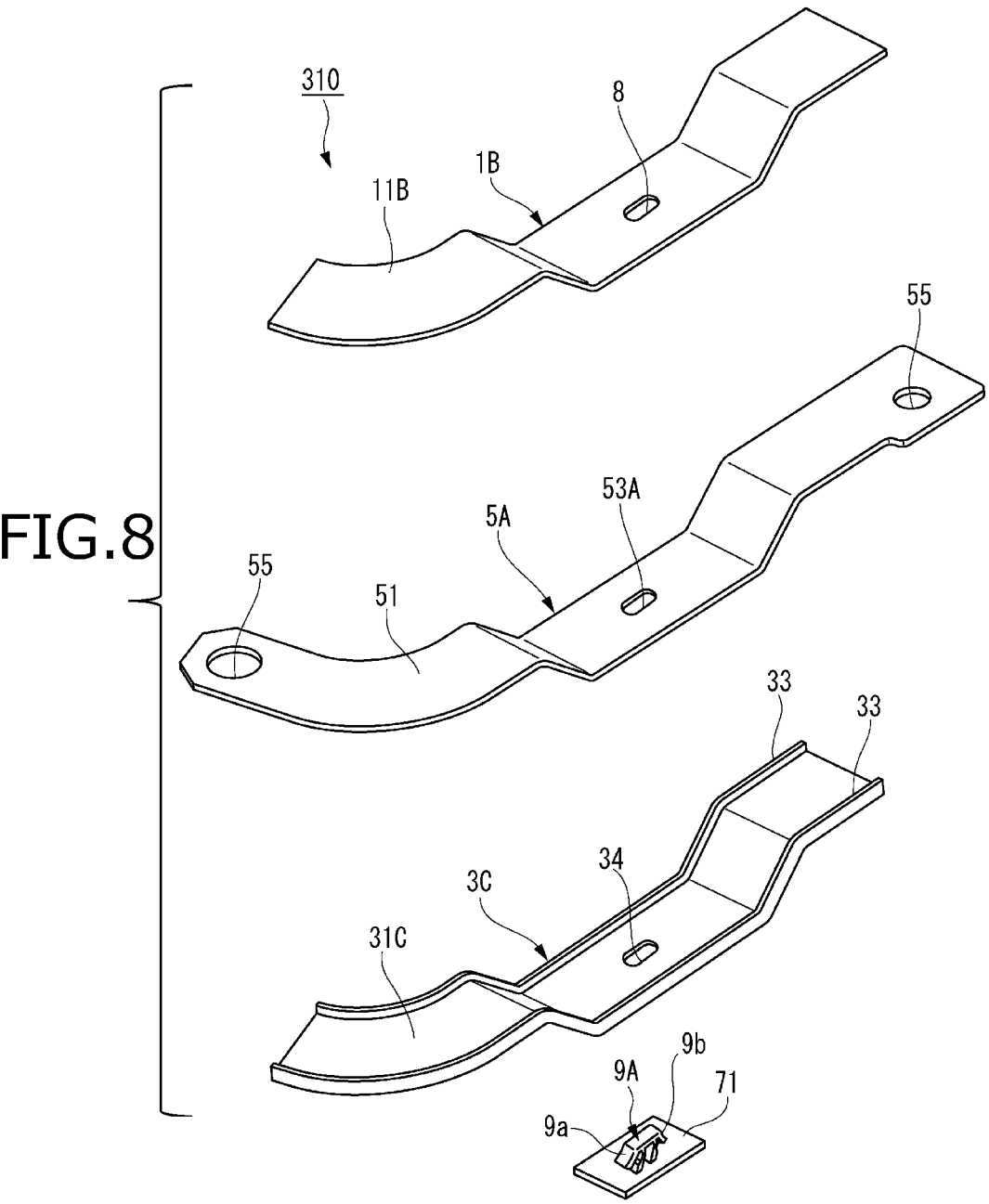

CONDUCTIVE MEMBER

CROSS REFERENCE TO RELATED APPLICATIONS

This application is based on Japanese Patent Application (No. 2018-116168) filed on Jun. 19, 2018, the contents of which are incorporated herein by reference.

BACKGROUND OF THE INVENTION

1. Field of the Invention

The present invention relates to a conductive member.

2. Description of the Related Art

Recently, a conductive member which is connected to a power supply such as a battery and supplies electricity to an electrical component or the like is used in a power supply circuit or the like. This type of conductive member includes a flat conductor (bus bar) having a substantially rectangular cross section.

It is necessary for the conductive member to ensure an electrical insulation property of the flat conductor. For example, as shown in FIGS. 9A and 9B, there has been known (refer to JP-A-2014-107201) a technique of insulating a flat conductor by a protector made of an insulating resin and a technique of coating the flat conductor with an insulating material.

As shown in FIG. 9A, a conductive member 510 includes a flat conductor (bus bar) 505 having a substantially rectangular cross section, and a main body 503 and a lid body 501 which are disposed to face each other with respect to front and back surfaces of the flat conductor 505, and sandwich and cover the flat conductor 505 from a plate thickness direction. The main body 503 and the lid body 501 are the protectors made of an insulating resin integrally molded by injection molding or the like.

As shown in FIG. 9B, the flat conductor 505 is made of a conductive metal plate 551 having a substantially long flat plate shape which is pressed into a predetermined shape, and bolt through holes 555 are formed at both end portions exposed from the main body 503 and the lid body 501.

The main body 503 includes a bottom wall portion 531 having substantially the same plan view shape as the flat conductor 505, and a plurality of engagement pieces 533 provided at both edge portions of the bottom wall portion 531. These engagement pieces 533 are provided at predetermined intervals in a longitudinal direction of the main body 503. An engagement claw is provided on an outer surface side of each of the engagement pieces 533 in a protruding manner.

The lid body 501 is mounted so as to cover an upper opening side of the main body 503 with the flat conductor 505 interposed therebetween, and sandwiches the flat conductor 505. The lid body 501 includes an upper wall portion 511 having substantially the same plan view shape as the flat conductor 505, and a plurality of engagement holes 512 provided at both edge portions of the upper wall portion 511. The engagement holes 512 are provided at predetermined intervals in a longitudinal direction of the lid body 501, corresponding to the engagement pieces 533, respectively.

When the lid body 501 is mounted on the main body 503, the engagement claw of each of the engagement pieces 533 of the main body 503 enters the engagement hole 512 of each of the lid body 501, respectively. Accordingly, the engagement claw of each of the engagement pieces 533 is locked to an engagement edge portion of each of the engagement holes 512, and the engagement holes 512 and the engagement pieces 533 are engaged and locked with each other. Therefore, the main body 503 and the lid body 501 engaged and locked sandwich and cover the flat conductor 505 from the plate thickness direction, so that the conductive member 510 is configured such that a periphery of the flat conductor 505 is electrically insulated except for the both end portions where the bolt through holes 555 are formed.

However, in the conductive member 510 shown in FIGS. 9A and 9B, the engagement pieces 533 provided on the both side edge portions of the main body 503 and the engagement holes 512 provided on the both side edge portions of the lid body 501 must be engaged and locked. Therefore, a dimension in a width direction of the conductive member 510 increases, a wiring space increases, and a large number of engagement locks provided on both side edge portions of the conductive member 510 have to be visually checked, resulting in a problem that an assembly workability is not good.

SUMMARY OF THE INVENTION

The present invention has been made in view of the above circumstances, and an object thereof is to provide a conductive member which is compact and has a good assembly workability.

The object according to the present invention is achieved by the following configuration.

(1) A conductive member including:

a flat conductor having a substantially rectangular cross section;

first and second cover members disposed so as to face each other with respect to front and back surfaces of the flat conductor, and sandwiching the flat conductor in a plate thickness direction of the flat conductor to cover the flat conductor, the first and second cover members being made of insulating resin;

a locking portion provided on the first cover member and protruding toward the second cover member; and an engagement portion provided on the second cover member, and configured to hold the first and second cover members in a state that the flat conductor is sandwiched between the first and second cover members and the engagement portion engages with the locking portion which passes through a through hole provided in a central portion of the flat conductor.

According to the conductive member having the configuration (1), the locking portion provided at least the first cover member penetrates through the through hole formed in the central portion (a part inward in a plan view from both side edge portions) of the flat conductor, and is engaged with the engagement portion provided at least the second cover member, so that the pair of cover members sandwiching and covering the flat conductor from the plate thickness direction can be integrally held. Therefore, it is unnecessary for the first and second cover members covering the flat conductor to provide engagement locks, such as the protectors in the conventional conductive member, at the both side edge portions. As a result, the conductive member having the configuration (1) can be made compact by reducing in dimension in a width direction, and a wiring space can be reduced.

Further, in the conductive member having the configuration (1), an engagement lock state between the first and second cover members can be confirmed only by visually checking an engagement part between the locking portion of one cover member, which penetrates through the central portion, and the engagement portion of the other cover member. Therefore, unlike the protectors in the conventional conductive member, it is unnecessary for the conductive member having the configuration (1) to visually check a large number of engagement locks provided at the both side edge portions, and an assembly workability is improved by reducing the number of steps of visual confirmation.

(2) The conductive member according to (1), wherein the engagement portion has a penetration opening; and wherein the locking portion has a pair of flexible lock pieces which are respectively engaged with opening edges of the penetration opening which face each other.

According to the conductive member having the configuration (2), the locking portion formed by the pair of flexible lock pieces penetrates through the through hole of the flat conductor, and is engaged with the engagement portion formed by the penetration opening. That is, the pair of flexible lock pieces provided on the first cover member penetrate through the through hole of the flat conductor, and locking protrusions are locked to the opening edges facing each other through the penetration opening provided on the other cover member so as to restrict slipping off, so that the cover members sandwiching and covering the flat conductor from the plate thickness direction can be integrally and easily held.

In addition, by elastically deforming expanded ends of the pair of flexible lock pieces in a direction approaching each other, engagement of the locking protrusions which are locked to the opening edges of the penetration opening so as to restrict the slipping off can be released, so that the pair of cover members can be easily separated.

(3) The conductive member according to (2), wherein the first cover member has a through hole and the pair of flexible lock pieces which protrude toward the second cover member from open edges of the through hole of the first cover member which face each other wherein the pair of flexible lock pieces of the first cover member are engaged with the opening edges of the penetration opening of the second cover member; wherein the second cover member has a pair of flexible lock pieces which protrude toward the first cover member from opening edges of the penetration opening of the second cover member, where the pair of flexible lock pieces of the first cover member are not engaged; and wherein the pair of flexible lock pieces of the second cover member are engaged with opening edges where the pair of flexible lock pieces of the first cover member are not provided, of the penetration opening of the first cover member.

According to the conductive member having the configuration (3), the locking protrusions of the pair of flexible lock pieces provided on the first cover member are engaged with the opening edges facing each other of the penetration opening provided in the second cover member, and the locking protrusions of the pair of flexible lock pieces provided on the second cover member are engaged with the opening edges, where the pair of flexible lock pieces are not formed, in the penetration opening provided in the first cover member. That is, the pair of flexible lock pieces provided on one cover member and the pair of flexible lock pieces provided on the second cover member penetrate through the through hole of the flat conductor, and the locking protrusions are locked to the opening edges of the penetration opening provided in the second cover member and the opening edges of the penetration opening provided in the first cover member so as to restrict the slipping off, respectively, so that the cover members sandwiching and covering the flat conductor from the plate thickness direction can be integrally and firmly held.

(4) The conductive member according to (2) or (3), wherein the engagement portion includes a protective wall configured to protect locking protrusions of the pair of flexible lock pieces engaged with the opening edges facing each other of the penetration opening.

According to the conductive member having the configuration (4), the locking protrusions of the pair of flexible lock pieces which are locked to the opening edges of the engagement portion so as to restrict the slipping off are protected by the protective wall. Therefore, at the time of a wiring work of the conductive member, or the like, there is no fear that an external member inadvertently contacts the locking protrusions of the flexible lock pieces to make the flexible lock pieces be deformed in a disengagement direction.

(5) The conductive member according to (1), wherein the engagement portion is formed by a penetration opening, and the locking portion is formed by a clamp where a pair of locking claws respectively engaged with opening edges facing each other of the penetration opening are provided at a tip end of a support shaft.

According to the conductive member having the configuration (5), the locking portion formed by the clamp which includes the pair of locking claws provided at the tip end of the support shaft penetrates through the through hole of the flat conductor, and is engaged with the engagement portion formed by the penetration opening. That is, the clamp provided on one of the cover members penetrates through the through hole of the flat conductor, and the pair of locking claws are engaged with the opening edges facing each other of the penetration opening provided in the other of the cover members, so that the pair of cover members sandwiching and covering the flat conductor from the plate thickness direction can be integrally and easily held.

Further, by elastically deforming expanded ends of the pair of locking claws of the clamp toward in a direction approaching each other, engagement of the locking claws with respect to the opening edges of the penetration opening can be released, so that the pair of cover members can be easily separated.

According to the conductive member of the present invention, a conductive member which is compact and has a good assembly workability can be provided.

The present invention has been briefly described above. The details of the present invention will be further clarified by reading a mode (hereinafter, referred to as an "embodiment") for carrying out the invention described below with reference to the accompanying drawings.

BRIEF DESCRIPTION OF THE DRAWINGS

FIGS. 3A to 3D are explanatory views for explaining one cover member (first cover member) shown in FIG. 2, in which FIG. 3A is an enlarged perspective view of a main part seen from an inner surface side, FIG. 3B is a side view of FIG. 3A, FIG. 3C is a sectional view taken along an arrow line A-A of FIG. 3A, and FIG. 3D is a sectional view taken along an arrow line B-B of FIG. 3A.

2, in which FIG. 4A is an enlarged perspective view of a main part seen from an inner surface side, FIG. 4B is a side view of FIG. 4A, FIG. 4C is a sectional view taken along an arrow line C-C of FIG. 4A, and FIG. 4D is a sectional view taken along an arrow line D-D of FIG. 4A.

FIGS. 5A to 5D are explanatory views for explaining the conductive member shown in FIG. 1, in which FIG. 5A is an enlarged plan view of a main part, FIG. 5B is a side view of FIG. 5A, FIG. 5C is a sectional view taken along an arrow line E-E of FIG. 5A, and FIG. 5D is a sectional view taken along an arrow line F-F of FIG. 5A.

FIG. 7 is an exploded perspective view of a conductive member according to a third embodiment of the present invention.

FIG. 8 is an exploded perspective view of a conductive member according to a fourth embodiment of the present invention.

DETAILED DESCRIPTION OF THE EXEMPLARY EMBODIMENTS

Hereinafter, an embodiment according to the present invention will be described with reference to drawings.

Figure 1:
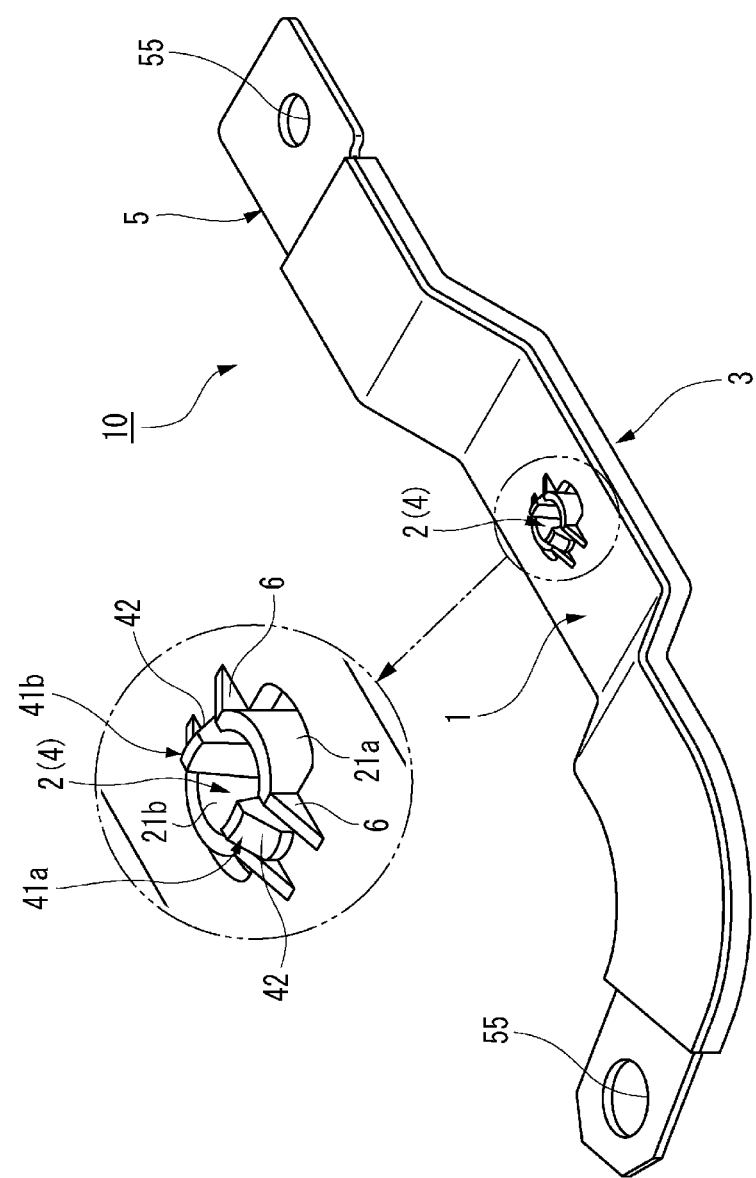
FIG. 1 is a perspective view and an enlarged view of a main part of a conductive member according to a first embodiment of the present invention.
Figure 2:
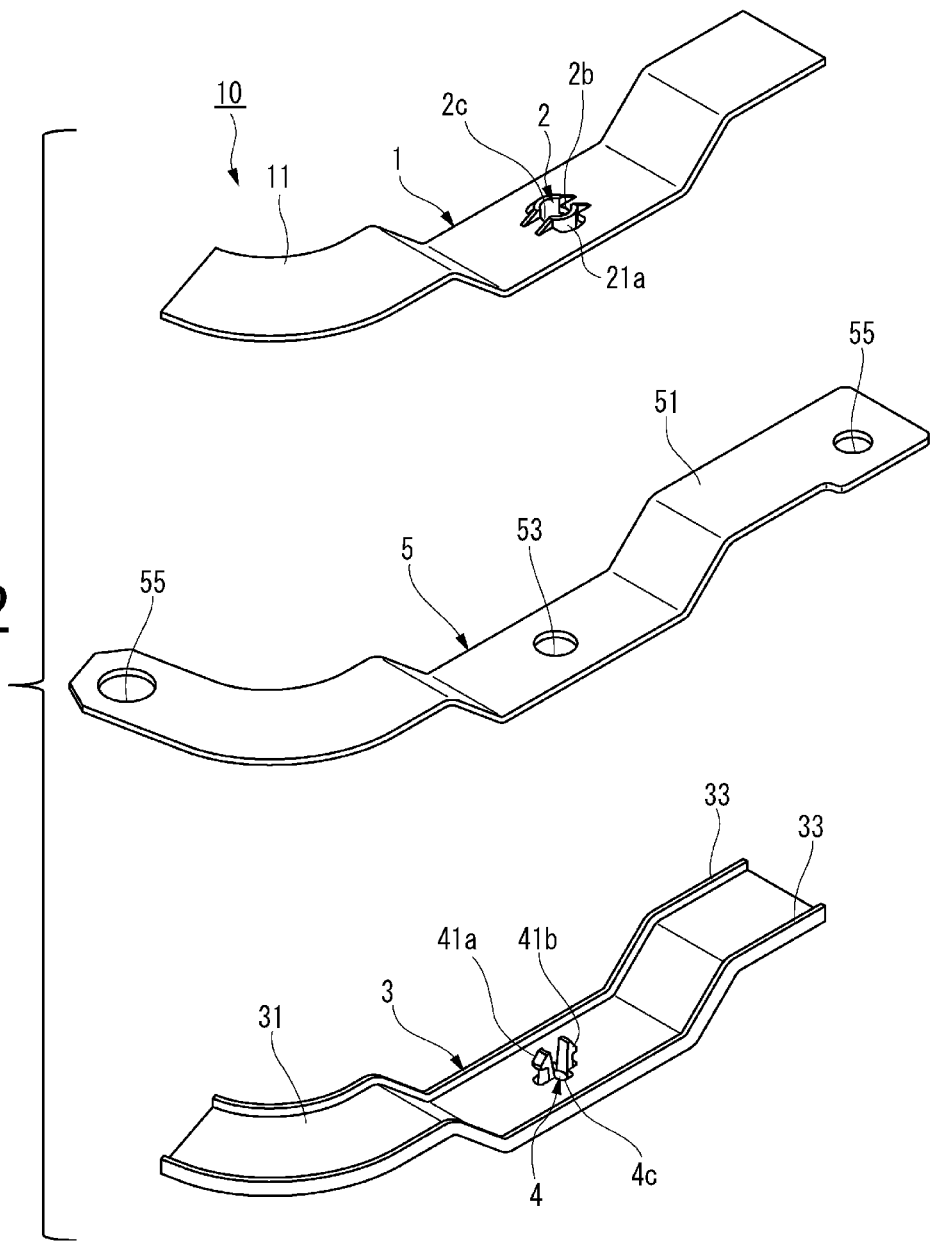
FIG. 2 is an exploded perspective view of the conductive member shown in FIG. 1.

FIG. 1 is a perspective view and an enlarged view of a main part of a conductive member 10 according to a first embodiment of the present invention, and FIG. 2 is an exploded perspective view of the conductive member 10 shown in FIG. 1.

The conductive member 10 according to the first embodiment is, for example, an inter-module bus bar used for electrical connection between a plurality of battery modules. It is needless to say that the conductive member of the present invention is applicable not only to the inter-module bus bar of the present embodiment but also to various power supply circuits such as a high-voltage cable wired between an electric motor and an inverter.

As shown in FIGS. 1 and 2, the conductive member 10 according to the first embodiment includes a flat conductor 5 having a substantially rectangular cross section, and a pair of insulating resin cover members 1, 3 disposed to face each other with respect to front and back surfaces of the flat conductor 5, and sandwiching and covering the flat conductor 5 from a plate thickness direction.

As shown in FIG. 2, the flat conductor 5 is made of a conductive metal plate 51 having a substantially long flat plate shape which is pressed into a predetermined shape, and bolt through holes 55 are formed at both end portions exposed from one cover member 1 and the other cover member 3. Further, a circular through hole 53 is formed in a central portion of the flat conductor 5.

For the conductive metal plate 51, various conductive metal materials such as copper or copper alloy, aluminum or aluminum alloy can be used.

Figure 3A:
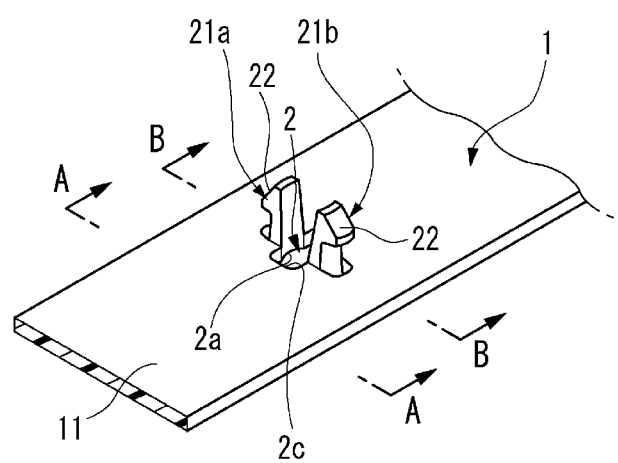
Figure 3B:
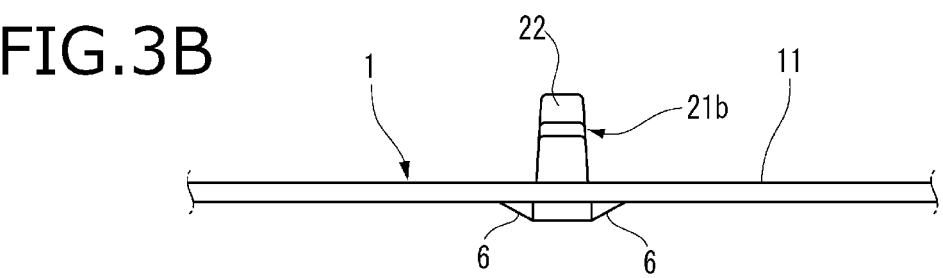
Figure 3C:
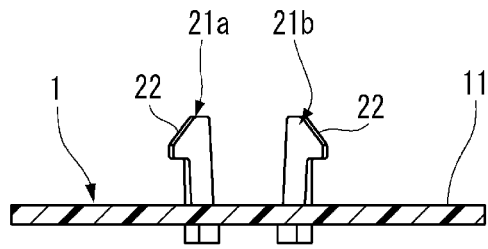
Figure 3D:
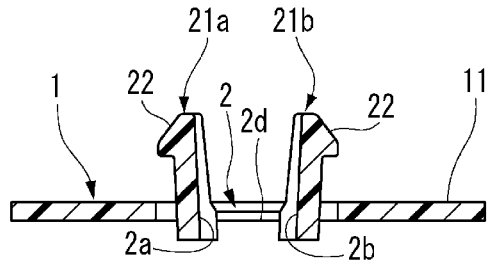
Figure 4A:
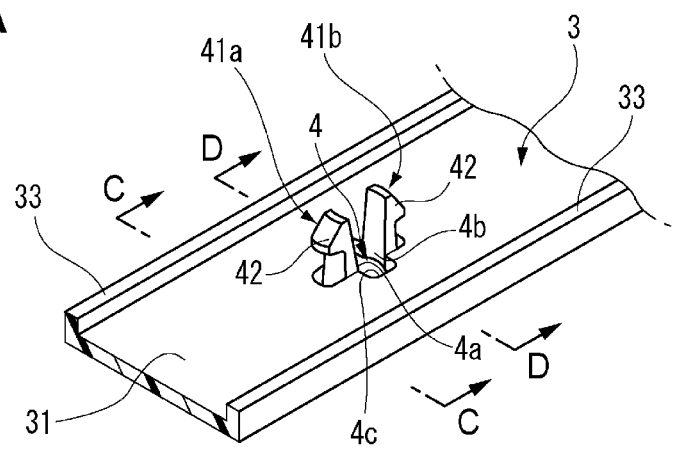
FIGS. 4A to 4D are explanatory views for explaining the other cover member (second cover member) shown in FIG.
Figure 4B:
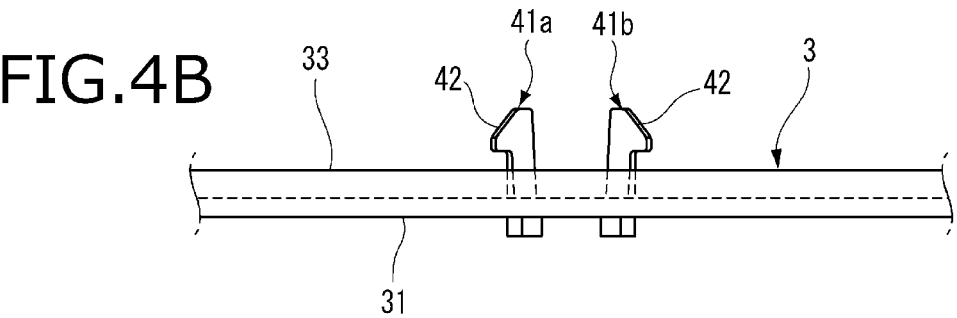
Figure 4C:
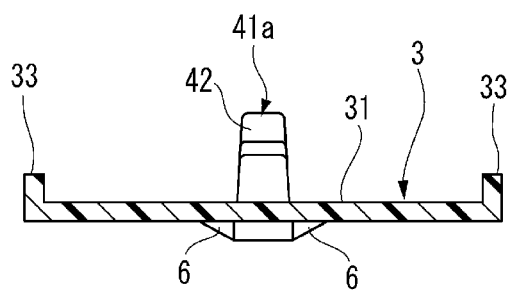
Figure 4D:
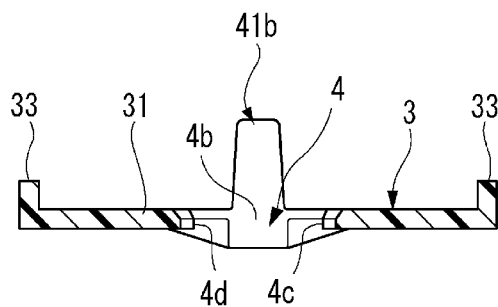
Figure 5A:
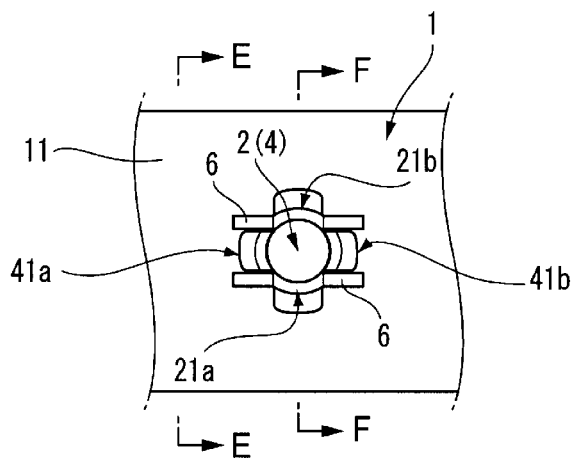
Figure 5B:
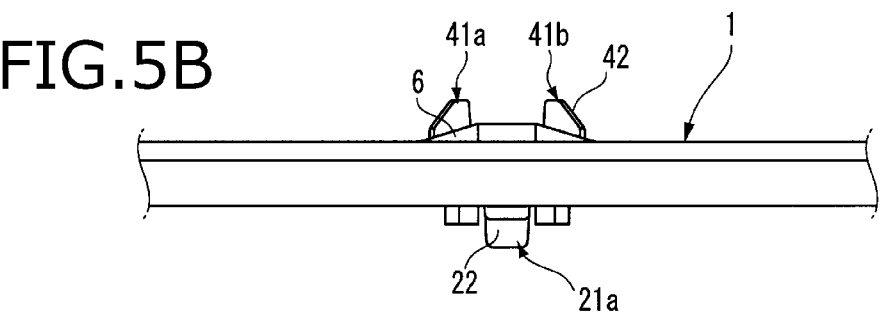
Figure 5C:
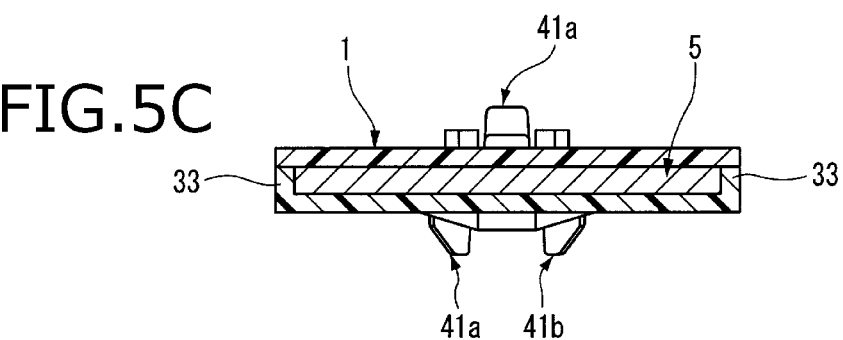
Figure 5D:
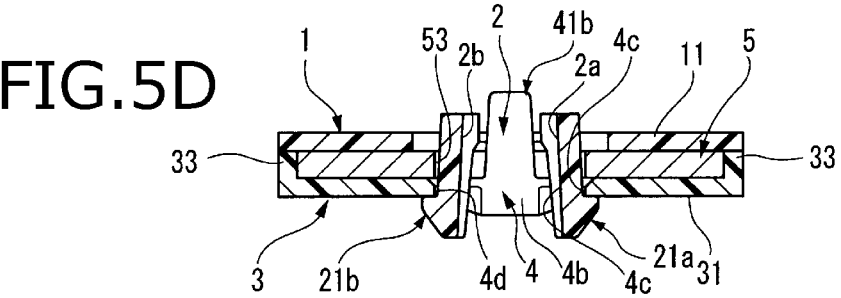

FIGS. 3A to 3D are explanatory views for explaining one cover member 1 shown in FIG. 2, in which FIG. 3A is an enlarged perspective view of a main part seen from an inner surface side, FIG. 3B is a side view of FIG. 3A, FIG. 3C is a sectional view taken along an arrow line A-A of FIG. 3A, and FIG. 3D is a sectional view taken along an arrow line B-B of FIG. 3A. FIGS. 4A to 4D are explanatory views for explaining the other cover member 3 shown in FIG. 2, in which FIG. 4A is an enlarged perspective view of a main part seen from an inner surface side, FIG. 4B is a side view of FIG. 4A, FIG. 4C is a sectional view taken along an arrow line C-C of FIG. 4A, and FIG. 4D is a sectional view taken along an arrow line D-D of FIG. 4A. FIGS. 5A to 5D are explanatory views for explaining the conductive member 10 shown in FIG. 1, in which FIG. 5A is an enlarged plan view of a main part, FIG. 5B is a side view of FIG. 5A, FIG. 5C is a sectional view taken along an arrow line E-E of FIG. 5A, and FIG. 5D is a sectional view taken along an arrow line F-F of FIG. 5A.

As shown in FIGS. 2 and 3, one cover member 1 includes an upper wall portion 11 having substantially the same plan view shape as the flat conductor 5 and a pair of flexible lock pieces 21a, 21b which are locking portions provided on the upper wall portion 11. The pair of flexible lock pieces 21a, 21b are integrally formed so as to protrude from opening edges 2a, 2b facing each other along a width direction of the upper wall portion 11 in a penetration opening 2, which is an engagement portion provided in a central portion of the upper wall portion 11, toward the other cover member 3 side. Expanded ends of the flexible lock pieces 21a, 21b are respectively formed with locking protrusions 22, and base portions of the flexible lock pieces 21a, 21b are respectively formed with reinforcing ribs 6.

A pair of flexible lock pieces 41a, 41b in the other cover member 3, which will be described later, are engaged with opening edges (that is, opening edges facing each other along a longitudinal direction of the upper wall portion 11) 2c, 2d, where the pair of flexible lock pieces 21a, 21b are not formed, in the penetration opening 2 of the upper wall portion 11.

As shown in FIGS. 2 and 4, the other cover member 3 includes a bottom wall portion 31 having substantially the same plan view shape as the flat conductor 5, the pair of flexible lock pieces 41a, 41b which are locking portions provided on the bottom wall portion 31, and side wall portions 33, 33 erected from both side edge portions of the bottom wall portion 31.

The pair of flexible lock pieces 41a, 41b are integrally formed so as to protrude from opening edges 4a, 4b facing each other along a longitudinal direction of the bottom wall portion 31 in a penetration opening 4, which is an engagement portion provided in a central portion of the bottom wall portion 11, toward one cover member 1 side. Expanded ends of the flexible lock pieces 41a, 41b are respectively formed with locking protrusions 42, and base portions of the flexible lock pieces 41a, 41b are respectively formed with the reinforcing ribs 6.

The pair of flexible lock pieces 21a, 21b in one cover member 1 are engaged with opening edges (that is, opening edges facing each other along a width direction of the bottom wall portion 31) 4c, 4d, where the pair of flexible lock pieces 41a, 41b are not formed, in the penetration opening 4 of the bottom wall portion 31.

The side wall portions 33, 33 has a height corresponding to a thickness of the flat conductor 5, and can cover both side edge portions of the flat conductor 5 placed on the bottom wall portion 31. Further, the side wall portions 33, 33 can be omitted in a case where width dimensions of the upper wall portion 11 and the bottom wall portion 31 are sufficiently large with respect to a width dimension of the flat conductor 5 to ensure an insulation property.

Next, an assembly procedure of the conductive member 10 will be described.

First, the conductive metal plate 51 of the flat conductor 5 is placed to be superposed on the bottom wall portion 31 of the other cover member 3, and the pair of flexible lock pieces 41a, 41b are penetrated through the through hole 53. Both side edge portions of the flat conductor 5 placed on the bottom wall portion 31 are covered with the side wall portions 33, 33, and upper surfaces of the side wall portions 33, 33 and an upper surface of the conductive metal plate 51 are substantially flush with each other.

Next, the upper wall portion 11 of one cover member 1 is placed to be superposed on the conductive metal plate 51 of the flat conductor 5. At this time, the pair of flexible lock pieces 21a, 21b penetrate through the through hole 53 of the flat conductor 5 and the penetration opening 4 of the other cover member 3, and the pair of flexible lock pieces 41a, 41b of the other cover member 3 penetrate through the penetration opening 2 of one cover member 1.

As shown in FIGS. 5A to 5D, in the pair of flexible lock pieces 21a, 21b in one cover member 1, the expanded ends penetrate through the through hole 53 of the flat conductor 5, and the locking protrusions 22 are engaged with the opening edges 4c, 4d, which face each other along the width direction of the bottom wall portion 31 on the penetration opening 4 provided in the other cover member 3. In addition, in the pair of flexible lock pieces 41a, 41b in the other cover member 3, the locking protrusions 42 at the expanded ends are engaged with the opening edges 2c, 2d, which face each other along the longitudinal direction of the upper wall portion 11 in the penetration opening 2 provided in one cover member 1.

That is, the pair of flexible lock pieces 21a, 21b in one cover member 1 are locked to the opening edge 4c, 4d by the locking protrusions 22 formed at the expanded ends so as to be restricted from slipping off from the penetration opening 4, respectively. In addition, the pair of flexible lock pieces 41a, 41b in the other cover member 3 are locked to the opening edge 2c, 2d by the locking protrusions 42 formed at the expanded ends so as to be restricted from slipping off from the penetration opening 2.

As a result, the pair of cover members 1, 3 which are disposed to face each other with respect to the front and back surfaces of the flat conductor 5, and sandwich and cover the flat conductor 5 from the plate thickness direction, are integrally held by the pair of flexible lock pieces 21a, 21b and the pair of flexible lock pieces 41a, 41b. Then, the conductive member 10 in which the front and back surfaces of the flat conductor 5 except the both end portions where the bolt through holes 55 are formed are covered by the pair of cover members 1, 3 can have a good electrical insulation property as a wiring member.

Next, an operation of the above configurations will be described.

According to the conductive member 10 according to the first embodiment, in the pair of flexible lock pieces 21a, 21b provided on one cover member 1, the locking protrusions 22 are engaged with the opening edges 4c, 4d facing each other of the penetration opening 4 provided in the other cover member 3, and in the pair of flexible lock pieces 41a, 41b provided on the other cover member 3, and the locking protrusions 42 are engaged with the opening edges 2c, 2d, where the pair of flexible lock pieces 21a, 21b are not formed, in the penetration opening 2 provided in one cover member 1.

That is, the pair of flexible lock pieces 21a, 21b provided on one cover member 1 and the pair of flexible lock pieces 41a, 41b provided on the other cover member 3 penetrate through the through hole 53 of the flat conductor 5, and the locking protrusions 22, 42 are locked to the opening edges 4c, 4d of the penetration opening 4 provided in the other cover member 3 and the opening edges 2c, 2d of the penetration opening 2 provided in one cover member 1 so as to restrict the slipping off, respectively, so that the pair of cover members 1, 3 sandwiching and covering the flat conductor 5 from the plate thickness direction can be integrally and firmly held.

Figure 9A:
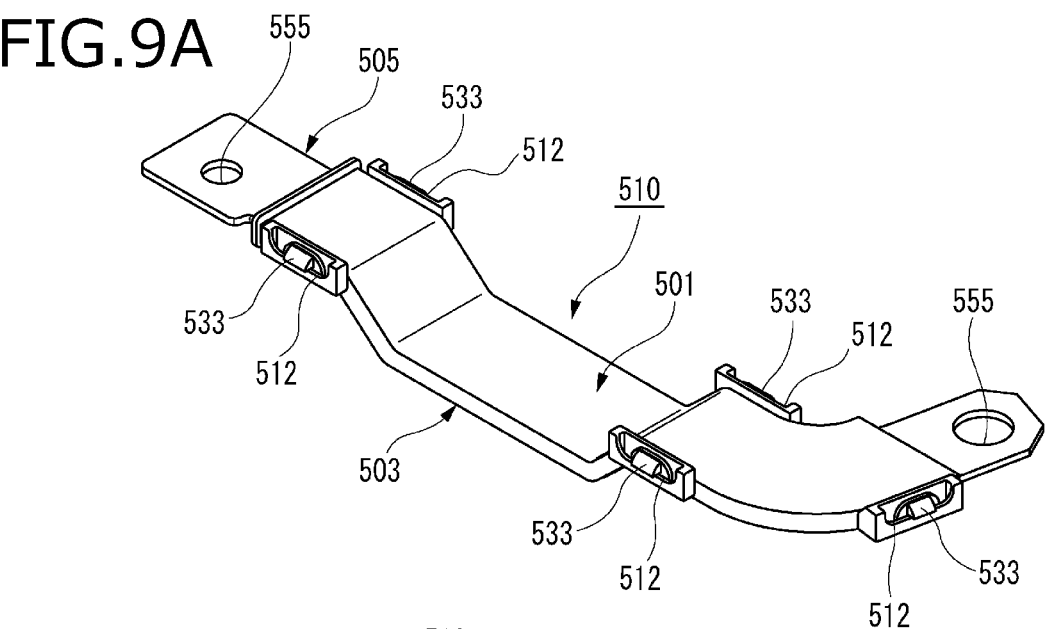
FIG. 9A is a perspective view for explaining a conventional conductive member.
Figure 9B:
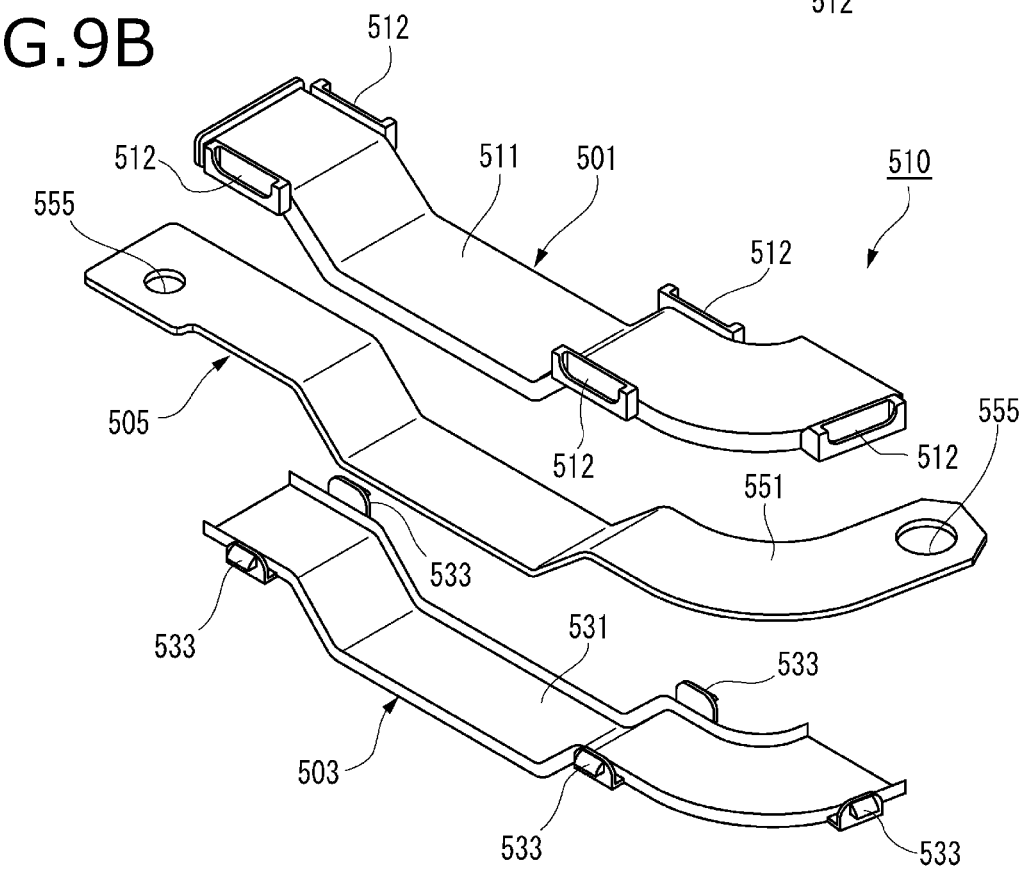
FIG. 9B is an exploded perspective view of the conventional conductive member shown in FIG. 9A.

Therefore, it is unnecessary for the pair of cover members 1, 3 covering the flat conductor 5 to provide the engagement locks (engagement holes 512 and engagement pieces 533), such as the protectors (main body 503 and lid body 501) in the conventional conductive member 510 shown in FIGS. 9A and 9B, at the both side edge portions. As a result, the conductive member 10 according to the first embodiment can be made compact by reducing in dimension in the width direction, and a wiring space can be reduced.

In the conductive member 10 according to the first embodiment, an engagement lock state between the pair of cover members 1, 3 can be confirmed only by visually checking one engagement part (alternatively, an engagement part between the pair of flexible lock pieces 41a, 41b, which are the locking portions of the other cover member 3, and the penetration opening 2, which is the engagement portion of one cover member 1) between the pair of flexible lock pieces 21a, 21b, which are the locking portions of one cover member 1 penetrating through the central portion (a part inward in a plan view from the both side edge portions), and the penetration opening 4, which is the engagement portion of the other cover member 3. Therefore, unlike the protectors (main body 503 and lid body 501) in the conventional conductive member 510 shown in FIGS. 9A and 9B, it is unnecessary for the conductive member 10 according to the first embodiment to visually check a large number of engagement locks (engagement holes 512 and engagement pieces 533) provided at the both side edge portions, and an assembly workability is improved by reducing the number of steps of visual confirmation.

The pair of flexible lock pieces 21a, 21b and the pair of flexible lock pieces 41a, 41b, which are the locking portions according to the first embodiment, penetrate through the through hole 53 of the flat conductor 5, and are engaged with the penetration opening 2 and the penetration opening 4 which are the engagement portion, respectively.

That is, the pair of flexible lock pieces 21a, 21b and the pair of flexible lock pieces 41a, 41b penetrate through the through hole 53 of the flat conductor 5, and the locking protrusions 22 and the locking protrusions 42 are locked to the opening edges 4c, 4d and the opening edge 2c, 2d, which face each other, through the penetration opening 4 and the penetration opening 2 so as to restrict the slipping off, respectively, so that the pair of cover members 1, 3 sandwiching and covering the flat conductor 5 from the plate thickness direction can be integrally and easily held. In addition, by elastically deforming the expanded ends of the pair of flexible lock pieces 21a, 21b and the pair of flexible lock pieces 41a, 41b in a direction approaching each other, the engagement of the locking protrusions 22, 42 which are locked to the opening edges 4c, 4d of the penetration opening 4 and the opening edges 2c, 2d of the penetration opening 2 so as to restrict the slipping off can be released, so that the pair of cover members 1, 3 can be easily separated.

Figure 6:
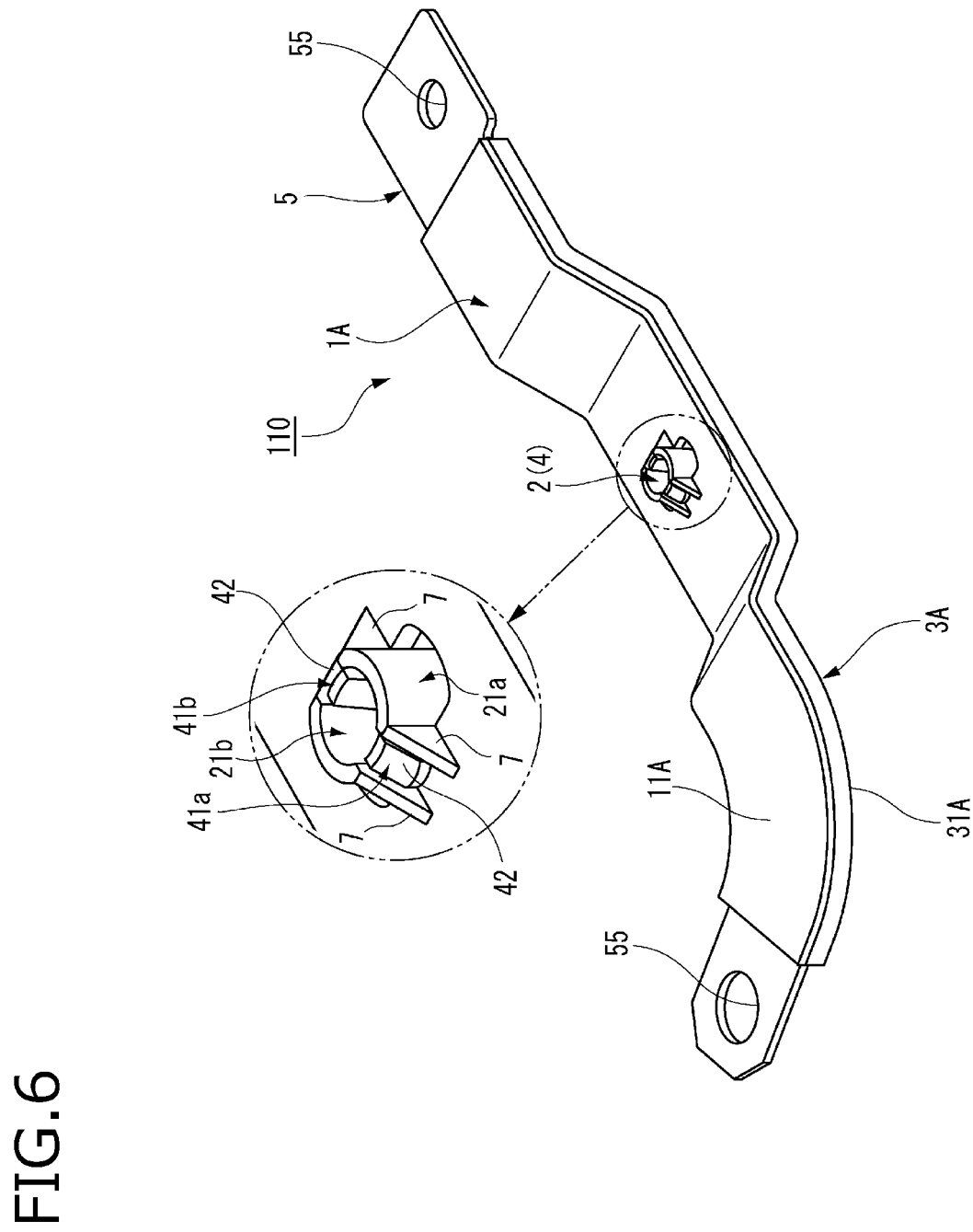
FIG. 6 is a perspective view and an enlarged view of a main part of a conductive member according to a second embodiment of the present invention.

FIG. 6 is a perspective view and an enlarged view of a main part of a conductive member 110 according to a second embodiment of the present invention. Further, in the second embodiment, the same members as those described in the first embodiment are denoted by the same reference numerals, and repetitive descriptions thereof will be omitted.

One cover member 1A includes an upper wall portion 11A having substantially the same plan view shape as the flat conductor 5 and the pair of flexible lock pieces 21a, 21b which are locking portions provided on the upper wall portion 11A. The expanded ends of the flexible lock pieces 21a, 21b are respectively formed with the locking protrusions 22 (refer to FIGS. 3A to 3D).

In addition, the other cover member 3A includes a bottom wall portion 31A having substantially the same plan view shape as the flat conductor 5, the pair of flexible lock pieces 41a, 41b which are locking portions provided on the bottom wall portion 31A, and the side wall portions 33 erected from both side edge portions of the bottom wall portion 31A. The expanded ends of the flexible lock pieces 41a, 41b are respectively formed with the locking protrusions 42 (refer to FIGS. 4A to 4D).

Further, at the base portions of the pair of flexible lock pieces 21a, 21b, protection walls 7 which protect the locking protrusions 42, 42 of the pair of flexible lock pieces 41a, 41b engaged with the opening edges 2c, 2d facing each other of the penetration opening 2 are formed, respectively. In addition, at the base portions of the pair of flexible lock pieces 41a, 41b, protective walls 7 which protect the locking protrusions 22, 22 of the pair of flexible lock pieces 21a, 21b engaged with the opening edges 4c, 4d facing each other of the penetration opening 4 are formed, respectively.

According to the conductive member 110 according to the second embodiment, the locking protrusions 42 of the pair of flexible lock pieces 41a, 41b which are locked to the opening edges 2c, 2d of the penetration opening 2 so as to restrict the slipping off, and the locking protrusions 22 of the pair of flexible lock pieces 21a, 21b which are locked to the opening edges 4c, 4d of the penetration opening 4 so as to restrict the slipping off are protected by the protective walls 7.

Therefore, at the time of a wiring work of the conductive member 110, or the like, there is no fear that an external member inadvertently contacts the locking protrusions 42 of the flexible lock pieces 41a, 41b and the locking protrusions 22 of the flexible lock pieces 21a, 21b to make the flexible lock pieces 41a, 41b and the flexible lock pieces 21a, 21b be deformed in a disengagement direction. Accordingly, the conductive member 110 can be prevented from being inadvertently disassembled.

In the conductive members 10, 110 according to the first and second embodiments, an example in which the pair of flexible lock pieces 21a, 21b and the pair of flexible lock pieces 41a, 41b, which are the locking portions, and the penetration opening 2 and the penetration opening 4, which are the engagement portions, are provided on both one cover member 1 (1A) and the other cover member 3 (3A) has been described. However, in the conductive member according to the present invention, one cover member may be provided with at least a locking member, and the other cover member may be provided with at least an engagement portion.

FIG. 7 is an exploded perspective view of a conductive member 210 according to a third embodiment of the present invention. Further, in the third embodiment, the same members as those described in the first embodiment are denoted by the same reference numerals, and repetitive descriptions thereof will be omitted.

As shown in FIG. 7, the conductive member 210 according to the third embodiment includes a flat conductor 5A having a substantially rectangular cross section, and a pair of insulating resin cover members 1B, 3B which are disposed to face each other with respect to front and back surfaces of the flat conductor 5A, and sandwich and cover the flat conductor 5A from a plate thickness direction. An elliptic through hole 53A is formed in a central portion of the flat conductor 5A.

One cover member 1B includes an upper wall portion 11B having substantially the same plan view shape as the flat conductor 5A, and an elliptic penetration opening 8 which is an engagement portion provided in a central portion of the upper wall portion 11B.

The other cover member 3B includes a bottom wall portion 31B having substantially the same plan view shape as the flat conductor 5A, a clamp 9 which is a locking portion provided on a central portion of the bottom wall portion 31B, and the side wall portions 33 erected from both side edge portions of the bottom wall portion 31B. A pair of locking claws 9a, 9b of the clamp 9 are provided at a tip end of a support shaft vertically provided on the bottom wall portion 31B.

According to the conductive member 210 according to the third embodiment, the clamp 9 including the pair of locking claws 9a, 9b provided at the tip end of the support shaft penetrates through the through hole 53A of the flat conductor 5A, and is engaged with the penetration opening 8 of one cover member 1B. That is, the clamp 9 provided on the other cover member 3B penetrates through the through hole 53A of the flat conductor 5A, and the pair of locking claws 9a, 9b are engaged with opening edges 8a, 8b facing each other of the penetration opening 8 provided in one cover member 1B, so that the pair of cover members 1B, 3B sandwiching and covering the flat conductor 5A from the plate thickness direction can be integrally and easily held.

In addition, by elastically deforming expanded ends of the pair of locking claws 9a, 9b of the clamp 9 in a direction approaching each other, engagement of the locking claws 9a, 9b with respect to the opening edges 8a, 8b of the penetration opening 8 can be released, so that the pair of cover members 1B, 3B can be easily separated.

As described above, the clamp 9, which is an engagement portion, can be provided only on the other cover member 3B, and the penetration opening 8 which is a locking portion can be provided only in one cover member 1B, so as to integrally hold them.

FIG. 8 is an exploded perspective view of a conductive member 310 according to a fourth embodiment of the present invention. Further, in the fourth embodiment, the same members as those described in the third embodiment are denoted by the same reference numerals, and a repetitive description thereof will be omitted.

As shown in FIG. 8, the conductive member 310 according to the fourth embodiment includes the flat conductor 5A having a substantially rectangular cross section, a pair of insulating resin cover members 1B, 3C which are disposed to face each other with respect to the front and back surfaces of the flat conductor 5A, and sandwich and cover the flat conductor 5A from the plate thickness direction, and a clamp 9A which is a locking portion.

The other cover member 3C includes a bottom wall portion 31C having substantially the same plan view shape as the flat conductor 5A, an elliptical penetration opening 34 provided in a center portion of the bottom wall portion 31C, and the side wall portions 33 erected from both side edge portions of the bottom wall portion 31C.

The pair of locking claws 9a, 9b of the clamp 9A are provided at a tip end of a support shaft vertically provided on a substrate portion 71 formed into a rectangular shape.

According to the conductive member 310 according to the fourth embodiment, the clamp 9A including the pair of locking claws 9a, 9b provided at the tip end of the support shaft penetrates through the penetration opening 34 of the other cover member 3C and the through hole 53A of the flat conductor 5A, and is engaged with the penetration opening 8 of one cover member 1B. That is, the clamp 9A formed separately from the pair of cover members 1B, 3C penetrates through the penetration opening 34 of the other cover member 3C and the through hole 53A of the flat conductor 5A, and the pair of locking claws 9a, 9b are engaged with the opening edges 8a, 8b facing each other of the penetration opening 8 provided in one cover member 1B, so that the pair of cover members 1B, 3C sandwiching and covering the flat conductor 5A from the plate thickness direction can be integrally and easily held.

Further, after the clamp 9A formed separately from the pair of cover members 1B, 3C penetrates through the penetration opening 8 of one cover member 1B and the through hole 53A of the flat conductor 5A, the pair of locking claws 9a, 9b are engaged with the opening edges facing each other of the penetration opening 34 provided in the other cover member 3C, so that the pair of cover members 1B, 3C sandwiching and covering the flat conductor 5A from the plate thickness direction can be integrally held.

Accordingly, according to the conductive members 10, 110, 210, and 310 according to the present embodiments, a conductive member which is compact and has a good assembly workability can be provided.

The present invention is not limited to the above embodiments, but modifications and applications made by those skilled in the art based on mutual combination of the configurations of the embodiments, description in the specification, and well-known art, are a plan of the present invention and within the scope of protection.

For example, in the conductive members of the above-described embodiments, the locking portion and the engagement portion are provided at one position, but in the case of a long conductive member, the locking portion and the engagement portion can also be provided at a plurality of positions along the longitudinal direction.

Here, features of the embodiments of the conductive member according to the present invention described above are summarized briefly and listed in the following [1] to [5], respectively.

[1] A conductive member (10) including:
a flat conductor (5) having a substantially rectangular cross section;
a first and second cover members (1, 3) disposed so as to face each other with respect to front and back surfaces of the flat conductor, and sandwiching the flat conductor in a plate thickness direction of the flat conductor to cover the flat conductor, the first and second cover members being made of insulating resin;
a locking portion (a pair of flexible lock pieces 21a, 21b) provided on the first cover member (1) and protruding toward the second cover member (3); and an engagement portion (penetration opening 4) provided on the second cover member (3), and configured to hold the first and second cover members in a state that the flat conductor is sandwiched between the first and second cover members and the engagement portion engages with the locking portion which passes through a through hole (53) formed in a central portion of the flat conductor.

[2] The conductive member (10) according to [1],
wherein the engagement portion has a penetration opening (4), and
wherein the locking portion has a pair of flexible lock pieces (21a, 21b) which are respectively engaged with opening edges (4c, 4d) of the penetration opening which face each other.

[3] The conductive member (10) according to [2],
wherein the first cover member has a through hole and the pair of flexible lock pieces (21a, 21b) which protrude toward the second cover member (3) from open edges (2a, 2b) of the through hole (2) of the first cover member which face each other;
wherein the pair of flexible lock pieces of the first cover member (1) are engaged with the opening edges (4c, 4d) of the penetration opening (4) of the second cover member (3);
wherein the pair of flexible lock pieces (41a, 41b) of the second cover member (3) are engaged with opening edges (4a, 4b) where the pair of flexible lock pieces (21a, 21b) of the first cover member (1) are not provided, of the penetration opening (4) of the first cover member (1).

[4] The conductive member (110) according to [2] or [3],
wherein the engagement portion includes a protective wall (7) configured to protect locking protrusions (42, 22) of the pair of flexible lock pieces (41a, 41b, 21a, 21b) engaged with the opening edges (2c, 2d; 4c, 4d) facing each other of the penetration opening (2, 4).

[5] The conductive member (210) according to [1],
wherein the engagement portion has a penetration opening (8), and wherein the locking portion has a clamp (9) where a pair of locking claws (9a, 9b) respectively engaging with opening edges (8a, 8b) facing each other of the penetration opening are provided at a tip end of a support shaft.

What is claimed is:

1. A conductive member comprising:
a flat conductor;
first and second cover members disposed so as to face each other with respect to front and back surfaces of the flat conductor, and sandwiching the flat conductor in a plate thickness direction of the flat conductor to cover the flat conductor, the first and second cover members being made of insulating resin;
a locking portion provided on the first cover member and protruding toward the second cover member; and
an engagement portion provided on the second cover member, and configured to hold the first and second cover members in a state that the flat conductor is sandwiched between the first and second cover members and the engagement portion engages with the locking portion which passes through a through hole provided in a central portion of the flat conductor,
wherein the engagement portion of the second cover member has a second penetration opening,
wherein the locking portion has a first pair of flexible lock pieces which are respectively engaged with opening edges of the second penetration opening of the second cover member which face each other,
wherein the first cover member has a first penetration opening and the first pair of flexible lock pieces protrude toward the second cover member from within the first penetration opening of the first cover member at opening edges thereof which face each other,
wherein the second cover member has a second pair of flexible lock pieces which protrude toward the first cover member from within the second penetration opening of the second cover member at opening edges thereof, where the first pair of flexible lock pieces of the first cover member are not engaged, and wherein the second pair of flexible lock pieces of the second cover member are engaged with opening edges where the first pair of flexible lock pieces of the first cover member are not provided, of the first penetration opening of the first cover member.

2. The conductive member according to claim 1, wherein the engagement portion of the second cover member includes a protective wall configured to protect locking protrusions of the first pair of flexible lock pieces of the first cover member engaged with the opening edges facing each other of the second penetration opening of the second cover member.

3. The conductive member according to claim 1, wherein the first cover member has an engagement portion which includes a protective wall configured to protect locking protrusions of the second pair of flexible lock pieces of the second cover member engaged with the opening edges facing each other of the first penetration opening of the first cover member.

4. The conductive member according to claim 1, wherein the locking portion of the first cover member has a clamp where a pair of locking claws respectively engaged with the opening edges facing each other of the second penetration opening of the second cover member are provided at a tip end of a support shaft.

* * * * *